United States Patent
Mahoney

(10) Patent No.: US 9,791,096 B2
(45) Date of Patent: Oct. 17, 2017

(54) ANTI-ROTATION BRACKET

(71) Applicant: Hamilton Sundstrand Corporation, Windsor Locks, CT (US)

(72) Inventor: Harold R. Mahoney, Holyoke, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 14/706,513

(22) Filed: May 7, 2015

(65) Prior Publication Data

US 2016/0327204 A1 Nov. 10, 2016

(51) Int. Cl.
*F16M 13/08* (2006.01)
*F16M 13/02* (2006.01)
*H01R 4/28* (2006.01)
*F16B 5/02* (2006.01)
*F16B 33/00* (2006.01)

(52) U.S. Cl.
CPC .............. *F16M 13/02* (2013.01); *F16B 5/02* (2013.01); *F16B 33/002* (2013.01); *H01R 4/28* (2013.01); *F16M 2200/024* (2013.01)

(58) Field of Classification Search
USPC .............. 248/200, 300, 207, 220.21, 220.22, 248/226.11, 227.2
See application file for complete search history.

(56) References Cited

U.S. PATENT DOCUMENTS

| | | |
|---|---|---|
| 1,666,896 A * | 4/1928 | Habenicht ............. B60T 17/046 248/300 |
| 5,316,346 A | 5/1994 | Maurer |
| 6,280,263 B1 | 8/2001 | Manor et al. |
| 6,719,481 B2 * | 4/2004 | Hoffmann ................. F16B 7/18 403/13 |
| 8,672,281 B2 | 3/2014 | Ernst et al. |
| 2011/0078975 A1 | 4/2011 | Spruiell |

FOREIGN PATENT DOCUMENTS

| | | |
|---|---|---|
| CN | 201165191 Y | 12/2008 |
| CN | 202992386 U | 6/2013 |
| EP | 1084926 A2 | 3/2001 |
| EP | 1733908 A1 | 12/2006 |
| ES | 2401386 A2 | 4/2013 |

OTHER PUBLICATIONS

Extended European Search Report for Application No. 16168709.0, dated Oct. 14, 2016, 7 Pages.

* cited by examiner

*Primary Examiner* — Alfred Wujciak
(74) *Attorney, Agent, or Firm* — Kinney & Lange, P.A.

(57) ABSTRACT

An assembly includes a mounting component having a first surface and a second surface with a hole extending between the first surface and the second surface. The assembly includes a flange extending generally perpendicularly in a first direction from a first end of the mounting component, and a first tab and a second tab extending generally perpendicularly in a second direction from a second end of the mounting component, wherein the first tab and the second tab are spaced apart from each other. The assembly includes a boss extending from a base plate, a fastener extending through the hole of the mounting component and into the boss, and an anti-rotation projection fixed to the boss and positioned between the first tab and the second tab.

9 Claims, 2 Drawing Sheets

ANTI-ROTATION BRACKET

BACKGROUND

The present disclosure relates generally to air management systems and, more particularly, to brackets securing components of air management systems.

Air management systems are used to provide a safe and comfortable environment on board an aircraft during flight. These electric and pneumatic systems control cabin temperature, ventilation and pressurization; engine bleed air regulation; fuel tank inerting; and ice protection and liquid cooling systems. Each of these systems requires an extensive network of wires and connectors to operate.

In a typical air management system, brackets are used to secure wires and connectors to base plates in relatively low-stress aircraft environments. These brackets come in many shapes and sizes, and utilize multiple fasteners to prevent bracket rotation. Typically, a bracket has at least one mounting portion secured to a baseplate and an end opposite the mounting portion for securing a component of an air management system, such as a wire harness. The mounting portion is connected to the baseplate by a first fastener. One or more fasteners are then added to the mounting portion to prevent rotation of the bracket around the first fastener, which in turn prevents strain on the wire(s) being secured by the bracket. These brackets therefore require extra machining and hardware to prevent bracket rotation, costing additional production time and materials and adding weight to aircraft air management systems.

SUMMARY

An assembly includes a mounting component having a first surface and a second surface with a hole extending between the first surface and the second surface. The assembly also includes a flange extending generally perpendicularly in a first direction from a first end of the mounting component, and a first tab and a second tab extending generally perpendicularly in a second direction from a second end of the mounting component, wherein the first tab and the second tab are spaced apart from each other. The assembly also includes a boss extending from a base plate, a fastener extending through the hole of the mounting component and into the boss, and an anti-rotation projection fixed to the boss and positioned between the first tab and the second tab.

An anti-rotation bracket includes a mounting component having a first surface and a second surface with a hole extending between the first surface and the second surface. The anti-rotation bracket also includes a flange having an aperture, the flange extending generally perpendicularly in a first direction from a first end of the mounting component. The anti-rotation bracket also includes a first tab and a second tab extending generally perpendicularly in a second direction from a second end of the mounting component, wherein the first tab and the second tab are spaced apart from each other.

A method of forming an assembly having an anti-rotation feature fixed to a boss extending from a base plate includes positioning a mounting component on the boss such that the anti-rotation feature is located between a first tab and a second tab, the first tab and the second tab extending in a first direction from a first end of the mounting component. The method also includes threading a fastener through a hole in the mounting component, and fastening the fastener in the boss. The method also includes and securing a component of a system in a flange extending in a second direction from a second end of the mounting component.

DETAILED DESCRIPTION

Figure 1:
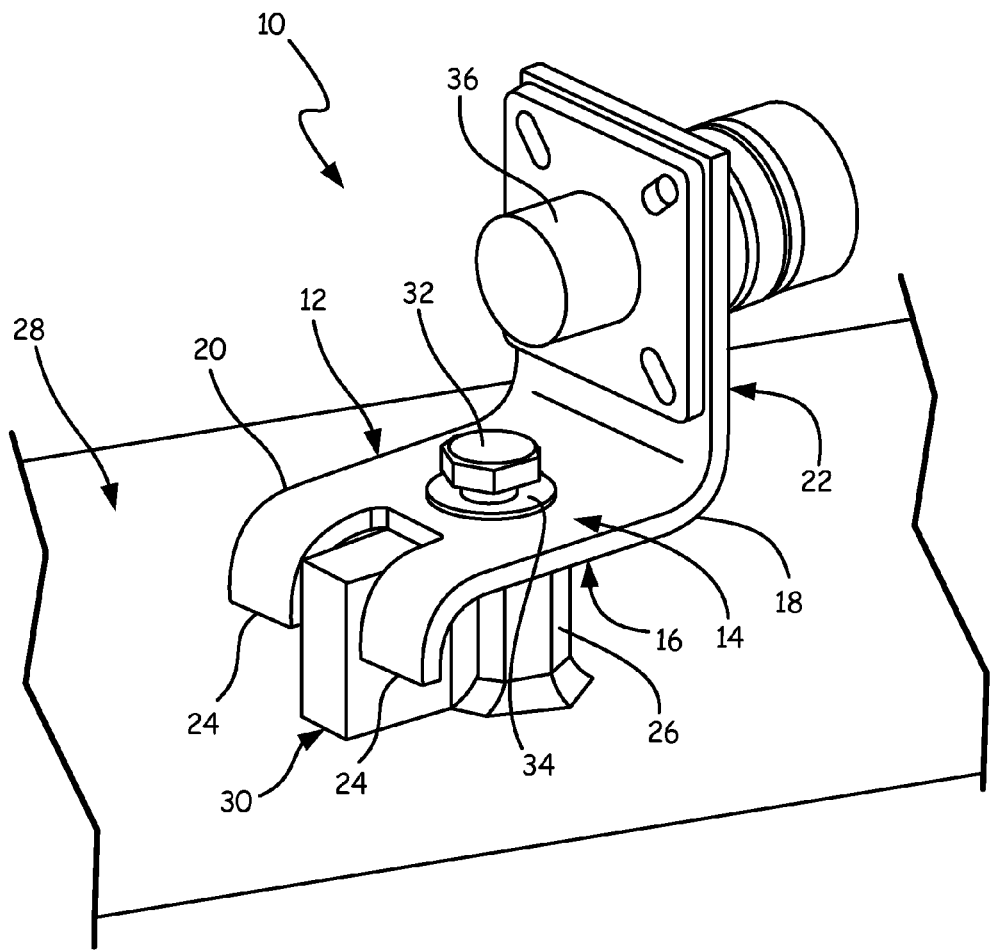
FIG. 1 is a perspective view of a bracket assembly according to the present disclosure.

FIG. 1 is a perspective view of bracket assembly 10 according to the present disclosure. While the present disclosure is described in the context of an aircraft air management system, it is to be understood that bracket assembly 10 could be used in any number of environments requiring rotation prevention of a fastener. Bracket assembly 10 includes mounting component 12, and mounting component 12 includes first surface 14, second surface 16, first end 18, and second end 20. Bracket assembly 10 also includes flange 22, tabs 24, boss 26, base plate 28, anti-rotation projection 30, fastener 32, washer 34, and component 36.

In the embodiment of FIG. 1, mounting component 12 is generally planar and rectangular in shape. In other embodiments, mounting component 12 can be any number of shapes suitable for connecting to flange 22 and tabs 24 and engaging boss 26. Mounting component 12 can be formed from a single sheet of metal together with flange 22 and tabs 24. Alternatively, flange 22 and tabs 24 can be machined separately and attached to mounting component 12 by welding or other suitable means. In the embodiment shown in FIG. 1, mounting component 12, flange 22, and tabs 24 are formed from aluminum by bending flange 22 and tabs 24 as discussed below. Alternatively, mounting component 12, flange 22, and tabs 24 can be formed from any material, including but not limited to stainless steel, suitable for the environment in which bracket assembly 10 is placed.

Mounting component 12, flange 22, and tabs 24 can be machined or formed by any suitable means, including but not limited to stamping, laser cutting, or thermal cutting from a flat stock of sheet metal. In the embodiment of FIG. 1, flange 22 is bent generally perpendicularly at a 90° angle to first surface 14 at first end 18 of mounting component 12. In other embodiments, flange 22 can be bent in any direction suitable for securing a portion of the system in which bracket assembly 10 is placed. Tabs 24 can be machined to be spaced apart from each other by any suitable means including laser cutting a metal shape to include two separate tabs 24 or removing a portion of material from an end of a stamped metal shape to form two separate tabs 24. In the embodiment of FIG. 1, tabs 24 are bent generally perpendicularly at a 90° angle to second surface 16 at second end 20 of mounting component 12. In other embodiments, tabs 24 can be bent in any direction suitable for engagement with anti-rotation projection 30.

In the embodiment of FIG. 1, boss 26 and anti-rotation projection 30 are integral with base plate 28. Specifically, in the embodiment of FIG. 1, boss 26 and anti-rotation projection 30 are machined together by numerical control machining a billet of aluminum or steel. In other embodiments, anti-rotation projection 30 can be welded onto an existing boss 26 extending from base plate 28. In other embodiments, boss 26 and anti-rotation projection 30 can be integrally cast or machined. In other embodiments, base plate 28 can be formed from a molded plastic, with boss 26 and anti-rotation projection 30 being molded together.

In the embodiment of FIG. 1, fastener 32 and washer 34 are used to secure mounting component 12 to boss 26. In other embodiments, any suitable fastening means can be used. Mounting component 12 has hole 38 (shown and described in FIG. 2) for receiving fastener 32. Boss 26 includes threaded portion 40 (shown and described in FIG. 2) for receiving fastener 32. Flange 22 includes aperture 42 (shown and described in FIG. 2) for receiving component 36. In the embodiment of FIG. 1, component 36 is a standard electrical connector. In other embodiments, component 36 can be any component of a system requiring stabilization or support, including a clamp, such as a P-clamp, or any other type of connector.

In the embodiment of FIG. 1, tabs 24 are bent in a direction to engage anti-rotation projection 30, and flange 22 is bent in a direction opposite that of tabs 24. In this arrangement, component 36 is spaced from base plate 28. In other embodiments, flange 22 can be bent in a direction similar to the direction of tabs 24, and component 36 can be adjacent base plate 28. In this manner, flange 22 and tabs 24 can be bent into any desired shape suitable for engaging anti-rotation projection 30 and securing component 36.

In the embodiment of FIG. 1, bracket assembly 10 is part of an electrical system powering an environmental control or air management system on board an aircraft. For example, in the embodiment of FIG. 1, component 36 is connected to a wire harness (not shown), and bracket assembly 10 prevents rotation of component 36, which in turn prevents strain on the wires of the system. In other embodiments, bracket assembly 10 can be used to prevent rotation of any type of component 36, component 36 being isolated or part of any type system. In the embodiment of FIG. 1, a single bracket assembly 10 is shown. In other embodiments, a plurality of bracket assemblies 10 can be used to secure multiple components 36.

In this manner, bracket assembly 10 includes components that can be bent and cut in any shape. Bracket assembly 10 can be utilized on its own or in a series to secure any number of points in a system. Thus, bracket assembly 10 can be used in any number of relatively low-stress environments on board an aircraft, including but not limited to environmental control or air management systems.

Figure 2:
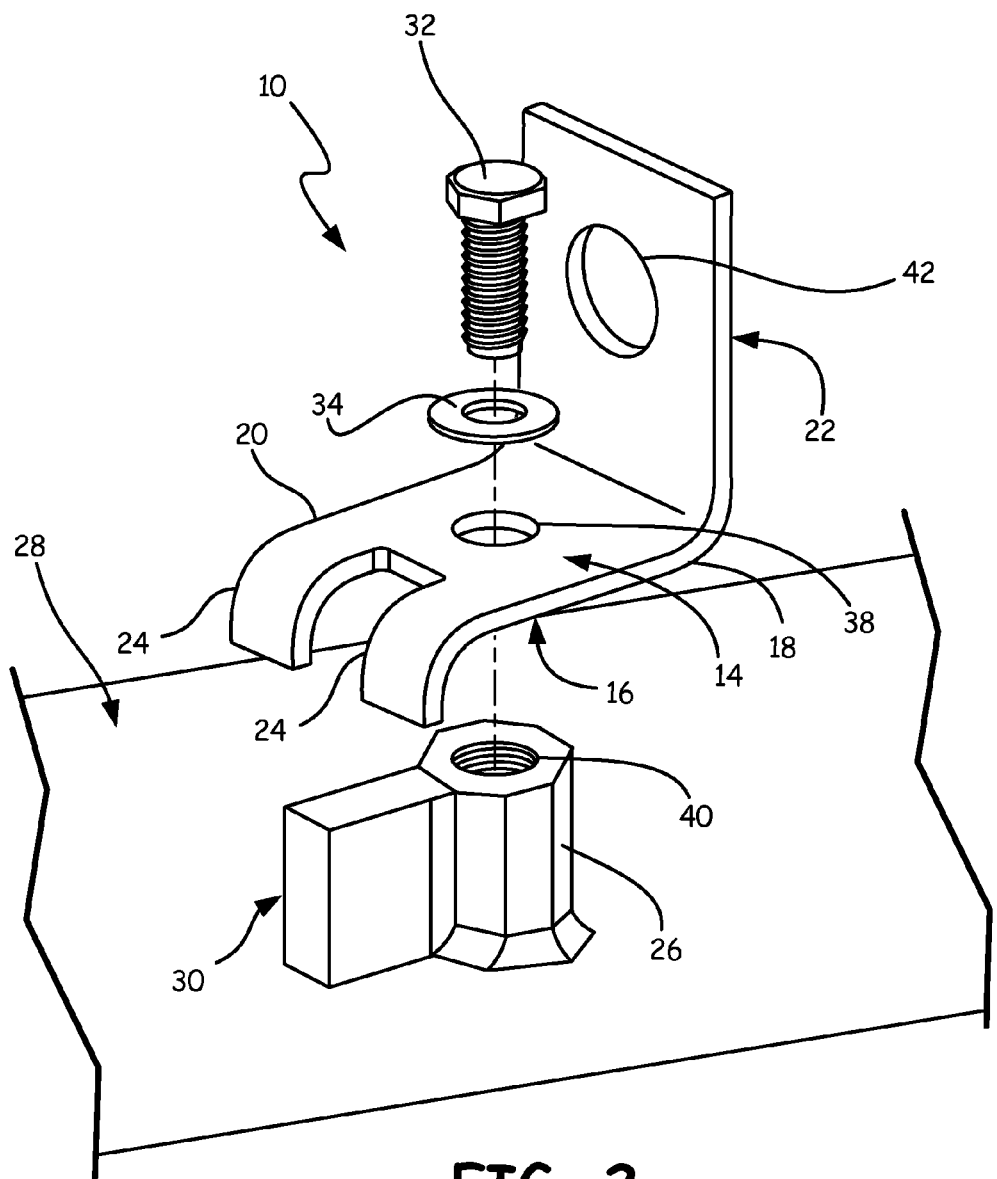
FIG. 2 is an exploded view of a bracket assembly according to the present disclosure.

FIG. 2 is an exploded view of bracket assembly 10 according to the present disclosure. Bracket assembly 10 includes, hole 38, threaded portion 40, and aperture 42.

Bracket assembly 10 can be formed as described in FIG. 1. FIG. 2 shows additional features of bracket assembly 10 present but not easily seen in FIG. 1. In the embodiment of FIG. 2, fastener 32 extends through washer 34 and hole 38. Hole 38 extends through first surface 14 and second surface 16 of mounting component 12. Hole 38 is positioned such that it lines up with threaded portion 40 of boss 26 when tabs 24 engage anti-rotation projection 30. Fastener 32 extends into threaded portion 40 of boss 26. Threaded portion 40 can be formed together with boss 26, or threaded portion 40 can be a threaded insert such as a Heli-Coil® insert, added after a hole is tapped in boss 26 during production. Aperture 42 in flange 22 can be any size or shape to accommodate component 36 (shown and described in FIG. 1).

In this manner, extra hardware typically required for securing brackets is eliminated. For example, rather than two threaded inserts (described in FIG. 2), two screws, and two washers being used to secure a bracket, bracket assembly 10 allows for the use of only a single insert, screw, and washer. Thus, bracket assembly 10 allows for secure, anti-rotational fastening while saving production time, materials, and weight.

Discussion of Possible Embodiments

The following are non-exclusive descriptions of possible embodiments of the present disclosure.

An assembly can include a mounting component having a first surface and a second surface with a hole extending between the first surface and the second surface. The assembly can also include a flange extending generally perpendicularly in a first direction from a first end of the mounting component, and a first tab and a second tab extending generally perpendicularly in a second direction from a second end of the mounting component, wherein the first tab and the second tab are spaced apart from each other. The assembly can also include a boss extending from a base plate, a fastener extending through the hole of the mounting component and into the boss, and an anti-rotation projection fixed to the boss and positioned between the first tab and the second tab.

The assembly of the preceding paragraph can optionally include, additionally and/or alternatively, any one or more of the following features, configurations and/or additional components:

A further embodiment of the foregoing assembly can include an aperture in the flange configured to secure a component of an electrical system.

A further embodiment of any of the foregoing assemblies can include that the component of the electrical system comprises an electrical connector or a clamp.

A further embodiment of any of the foregoing assemblies can include a plurality of assemblies securing a plurality of components within an electrical system.

A further embodiment of any of the foregoing assemblies can include that the boss comprises a threaded portion for receiving the fastener.

An anti-rotation bracket can include a mounting component having a first surface and a second surface with a hole extending between the first surface and the second surface. The anti-rotation bracket can also include a flange having an aperture, the flange extending generally perpendicularly in a first direction from a first end of the mounting component. The anti-rotation bracket can also include a first tab and a second tab extending generally perpendicularly in a second direction from a second end of the mounting component, wherein the first tab and the second tab are spaced apart from each other.

The anti-rotation bracket of the preceding paragraph can optionally include, additionally and/or alternatively, any one or more of the following features, configurations and/or additional components:

A further embodiment of the foregoing anti-rotation bracket can include that the bracket is formed from a single piece of metal.

A further embodiment of any of the foregoing anti-rotation brackets can include that the single piece of metal comprises aluminum or stainless steel.

A further embodiment of any of the foregoing anti-rotation brackets can include that the aperture is configured to secure a component of an electrical system.

A further embodiment of any of the foregoing anti-rotation brackets can include that the first tab and the second tab are configured to engage an anti-rotation projection.

A further embodiment of any of the foregoing anti-rotation brackets can include that the second direction is a direction opposite the first direction.

A method of forming an assembly having an anti-rotation feature fixed to a boss extending from a base plate can include positioning a mounting component on the boss such that the anti-rotation feature is located between a first tab and a second tab, the first tab and the second tab extending in a first direction from a first end of the mounting component. The method can also include threading a fastener through a hole in the mounting component, and fastening the fastener in the boss. The method can also include and securing a component of a system in a flange extending in a second direction from a second end of the mounting component.

The method of the preceding paragraph can optionally include, additionally and/or alternatively, any one or more of the following features, configurations and/or additional components:

A further embodiment of the foregoing method can include welding the anti-rotation feature to the boss.

A further embodiment of any of the foregoing methods can include machining the anti-rotation feature together with the boss during production of the base plate.

A further embodiment of any of the foregoing methods can include that the mounting component is a generally rectangular sheet of metal.

A further embodiment of any of the foregoing methods can include that the first tab and the second tab extend generally perpendicularly from the first end of the mounting component, and the flange extends generally perpendicularly from the second end.

A further embodiment of any of the foregoing methods can include that the threaded portion of the boss comprises a threaded insert.

A further embodiment of any of the foregoing methods can include securing the component of the system in the flange includes securing an electrical connector or a clamp in an aperture in the flange.

A further embodiment of any of the foregoing methods can include that the second direction is generally opposite the first direction.

A further embodiment of any of the foregoing methods can include fixing a plurality of bosses to the base plate for securing a plurality of components within the system.

While the present disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the invention without departing from the essential scope thereof. Therefore, it is intended that the disclosure not be limited to the particular embodiment disclosed, but that the disclosure will include all embodiments falling within the scope of the appended claims.

The invention claimed is:

1. Anti-rotation bracket comprising:
    a mounting component having a first surface and a second surface with a hole extending between the first surface and the second surface;
    a flange extending generally perpendicularly in a first direction from a first end of the mounting component;
    a first curved tab and a second curved tab extending generally perpendicularly in a second direction from a second end of the mounting component, the first tab and the second tab curving away from the flange, wherein the first tab and the second tab are spaced apart from each other;
    a boss extending from a base plate, wherein the boss comprises a threaded portion for receiving the fastener;
    a fastener extending through the hole of the mounting component and into the boss; and
    an anti-rotation projection fixed to the boss and positioned between the first tab and the second tab.

2. The anti-rotation bracket of claim 1 and further comprising an aperture in the flange configured to secure a component of an electrical system.

3. The anti-rotation bracket of claim 2, wherein the component of the electrical system comprises an electrical connector or a clamp.

4. A plurality of anti-rotation brackets according to claim 3, wherein the plurality of anti-rotation brackets secure a plurality of components within the electrical system.

5. The anti-rotation bracket of claim 1, wherein the mounting component, flange and first and second tabs are formed from a single piece of metal.

6. The anti-rotation bracket of claim 5, wherein the single piece of metal comprises aluminum or stainless steel.

7. The anti-rotation bracket of claim 1, wherein the first tab and the second tab are configured to engage the anti-rotation projection.

8. The anti-rotation bracket of claim 1, wherein the second direction is a direction generally opposite the first direction.

9. The anti-rotation bracket of claim 1, wherein the flange, the mounting component and the first and second tabs generally form an S-shape.

* * * * *